United States Patent [19]

Daniels et al.

[11] Patent Number: 4,504,915

[45] Date of Patent: Mar. 12, 1985

[54] METHOD AND APPARATUS FOR INDIVIDUALIZED POSTAGE VALUE COMPUTING

[75] Inventors: Edward P. Daniels, Bridgeport; Daniel F. Dlugos, Huntington, both of Conn.

[73] Assignee: Pitney Bowes Inc., Stamford, Conn.

[21] Appl. No.: 393,839

[22] Filed: Jun. 30, 1982

[51] Int. Cl.[3] .......... G06F 15/40

[52] U.S. Cl. .......... 364/466; 364/900

[58] Field of Search .......... 364/466, 900; 177/25

[56] References Cited

U.S. PATENT DOCUMENTS

| | | | |
|---|---|---|---|
| 3,635,297 | 1/1972 | Salava | 177/25 X |
| 4,180,856 | 12/1979 | Check, Jr. et al. | 364/466 |
| 4,271,470 | 6/1981 | Dlugos et al. | 364/466 |
| 4,286,325 | 8/1981 | Dlugos et al. | 364/466 |
| 4,308,579 | 12/1981 | Dlugos | 364/466 X |
| 4,320,461 | 3/1982 | Dlugos | 364/466 |
| 4,325,440 | 4/1982 | Crowley et al. | 177/25 |
| 4,376,981 | 3/1983 | Check, Jr. et al. | 364/466 X |
| 4,430,716 | 2/1984 | Dlugos et al. | 364/466 |

*Primary Examiner*—Errol A. Krass
*Assistant Examiner*—Edward R. Cosimano
*Attorney, Agent, or Firm*—Robert H. Whisker; Albert W. Scribner; William D. Soltow, Jr.

[57] ABSTRACT

Automatic postage value computing for individually selected services is described using a replaceable individualized directory memory and a replaceable rate chart memory suitable with all directory memories. Memories are provided with pseudo rate charts that resemble conventional rate charts but serve to either grant or deny access to a rate chart depending upon the user's selection. The use of pseudo rate charts permits an unbundling of the postage value computation services to serve the user's needs, without requiring program changes. With individualized directory memory rate selection the updating of user rate chart memories is limited to those rates he has selected. Several embodiments are described.

9 Claims, 3 Drawing Figures

METHOD AND APPARATUS FOR INDIVIDUALIZED POSTAGE VALUE COMPUTING

FIELD OF THE INVENTION

This invention relates to automatic postage value computing generally and more specifically to a method and apparatus for individualizing the computation of postage values for users having particular mailing requirements.

BACKGROUND OF THE INVENTION

Postage value computing systems have been described in the art. Such systems, in response to weight information of the article to be mailed and its destination, determine the amount of postage to be applied. The required postage is a function of many variables such as, for example, different classes, whether for United States Postal Service (USPS) or United Parcel Service (UPS) or international service, etc. In addition, special fees may be selected and additional required postage for that must be computed.

In the U.S. Pat. No. 4,286,325 to D. F. Dlugos et al a postal value computing system is described which is capable of handling a wide range of postage variables. The system as schematically shown in FIG. 1 herein organizes the postage values in rate charts 22 occupying respective areas in a memory 24. Since rates are subject to change, the rate charts 22 are stored in physically replaceable memories 24 such as may be formed with programmable read-only memory (PROM) devices.

Computation of a postal value is commenced with the actuation of a key 26.1 in a keyboard 28 as described with reference to FIG. 5 in the U.S. Pat. No. 4,286,325 patent. A program operable in a processor (not shown in FIG. 1) connected to the keyboard 28 causes a transfer to a particular memory location 30.1 in a portion of a memory 32 referred to as a directory. The directory memory 32 contains in location 30.1 data which serves as a vector 32.1 ($V_1$) to direct the program of the microprocessor to a start location 36.1 in rate memory 24 necessary to reach the rate charts 22 needed in response to the actuated key 26.1 and the article weight. As part of the process to reach a rate chart 22, the program recognizes that certain keys 26 need an additional code entry. This recognition is done in response to the analysis of the contents of rate memory location 36.1 to which the program was vectored by vector 32.1. The contents of rate memory location 36 is a definition byte 38 that causes the program to request from the operator, by way of a display prompt, the entry of a code. Such code defines a particular rate chart. For example, if the keyboard key 26.3 for express had been actuated, then the program requires entry of a numerical code with a numeric keyboard 39 to determine what kind of express mail is requested. The express mail may be domestic-same-day airport service requiring a two digit code 01, or international express-on-demand to Canada, code 13. Use of such codes are well known.

Once a code has been entered, the program derives from the successive locations 40 and 42 following the definition byte 38, a vector 44 that directs the program to the first part 46 of an index table 48 commencing at rate memory location 50.

Thus, in response to an analysis by the program of the signal generated by actuated key 26.1 and the subsequent code entries made by the operator the index table

48 is reached. The program then compares the entered code with those in the index 48 until a match is found, such as at 52, where the program finds an address of the pertinent rate chart such as 22.1.

Before the program derives a rate from a rate chart, an initial comparison, as described in the Dlugos patent, involves the start and stop weights applicable to that rate chart with the measured weight of the article for which postage is to be computed. This comparison determines whether the article weight is in the range of the rate chart and thus whether the chart should be used at all. In the event the article weight is outside the range of the rate chart, the program automatically advances to the next higher rate chart whose address location is stored with other data in the first or lower range rate chart.

The rate charts 22 frequently change as postal rates fluctuate. Hence, the many postage value computation systems 30 in the field require that their memories be frequently updated with new replaceable PROM memories for new rate charts. In addition, new directory memories are needed when rate charts are relocated in memory 24, for example, in response to a need to expand or add special rate chart increments and the like. Such updating of memories becomes expensive for the user, particularly when his use of an automatic postage value computing system 20 involves only particular rate charts so that he has no interest in having normally unused rate charts kept current.

SUMMARY OF THE INVENTION

In an automatic postage value computing system in accordance with the invention, a user may conveniently select specific postage value computations and these may then be updated as their rates are changed. This enables a minimum of replaceable memories for each user with the memories tailored to fit that user's particular requirements.

As described herein for one embodiment in accordance with the invention, the directory and rate chart memories for each postage value computing system are located in separate physically replaceable memory devices. The rate chart memory device includes pseudo rate charts which conform to established microprocessor programming whereby the program can proceed without alteration, via the pseudo rate chart, to the proper rate charts whose locations in memory can be selected and varied as appears appropriate.

When a particular rate chart is not selected by the user, the directory, in response to the actuation of a key seeking to use such rate chart, causes the program to vector to a location equivalent to a denial of access requested by the key. In this manner, certain rate charts are made available to the user in accordance with his individual selection while he is excluded from all others by controlling vector data in the directory memory.

The term "pseudo rate chart" as employed herein means a rate chart as, for example, shown in FIG. 10 of the aforementioned Dlugos et al patent, except that the start and stop weights for the rate chart are so selected so as to cause an immediate escape to the next chart. In such case, the pseudo rate chart does not include other weight and rate data. The pseudo rate chart thus appears as an ordinary rate chart to the microprocessor program but functions as a vector without requiring program modifications.

With the use of pseudo rate charts which do not require program changes, rate charts for postal value computing systems that are already in use can be advantageously and properly vectored to by both old directories 32 employed in such systems as well as new directories, with which only specific postal values can be computed.

With an automatic postage value computing system in accordance with the invention, a user is provided with a replaceable directory memory (PROM) which need not be changed unless the user requires access to different rate charts. The user's rate chart memories are updated, however, but only when those rate charts selected by the user require updating. Hence, the updating service for the user tends to be less frequent and less expensive.

In another form for a postage value computing system in accordance with the invention, the pseudo rate charts are used in another technique to allow user selection of particular rate charts. This involves the use of pseudo rate charts to unbundle of international rates so as to allow individual users to select or exclude certain mail services such as the exclusion of surface international mailing while including international air service.

In the latter form for a postage value computing system in accordance with the invention pseudo rate charts need only be provided for those international rate charts that are to be employed by the user. This constitutes an advantageously more efficient use of pseudo rate charts for individualized postal rate computational services.

It is, therefore, an object of the invention to provide a method and apparatus for tailoring a postage value computing system to the needs of an individual user. It is a further object of the invention to conveniently and effeciently update a postage value computing system as new postage rates occur. It is still further an object of the invention to enable existing postage value computing systems to be updated with the same physically replaceable rate memories as are used with similarly programmed systems which are tailored to fit the needs of individual users.

These advantages and objects of the invention can be understood from the following detailed description of several embodiments in accordance with the invention and which are described in conjunction with the drawings.

DETAILED DESCRIPTION OF DRAWINGS

Figure 1:
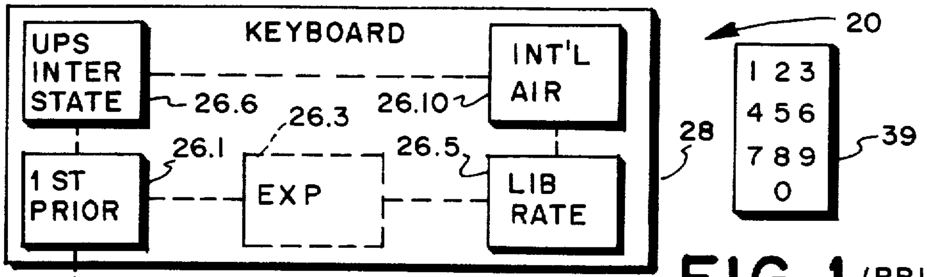
FIG. 1 (PRIOR ART)
FIG. 1 is a schematic representation of pertinent segments of a prior art postage value computing system.

With reference to FIG. 1, a postage value computing system 20 is shown in generalized manner. System 20 essentially is similar to that as shown and described in U.S. Pat. No. 4,286,325 to Dlugos et al. Thus, system 20 incorporates a microprocessor with memories and a program to calculate postage values for the variety of mailing conditions as are encountered and described in the latter patent. This invention is intended in its preferred embodiment to work with a system as described in the Dlugos et al patent.

System 20 as described in the Dlugos et al patent incorporates as part of its replaceable rate memory a plurality of rate charts 22 from which the postage value of an article to be mailed is computed. All of the rate charts 22 as described in the patent are available to the user, who thus may automatically compute postage for different articles to be mailed almost anywhere in the world in different classes and under different special conditions.

Since postage rates fluctuate, frequent rate chart replacements must be mailed to the system user. This involves sending to each user a replaceable memory 24 such as a programmable read-only memory device (PROM), containing updated rate charts 22.

When the user, however, employs a more limited mailing which requires only a few of the rate charts 22, the number of rate chart replacements can be reduced and thus provide the user with a cost saving.

If a system user is to be limited in his access to rate charts to those he needs, it is still important to maintain those selected rate charts current. When the large number of rate charts are considered as well as the number of users who may require different specific rate charts, the complexity of keeping track of the different system users and their individualized rate charts can be appreciated.

Figure 2:
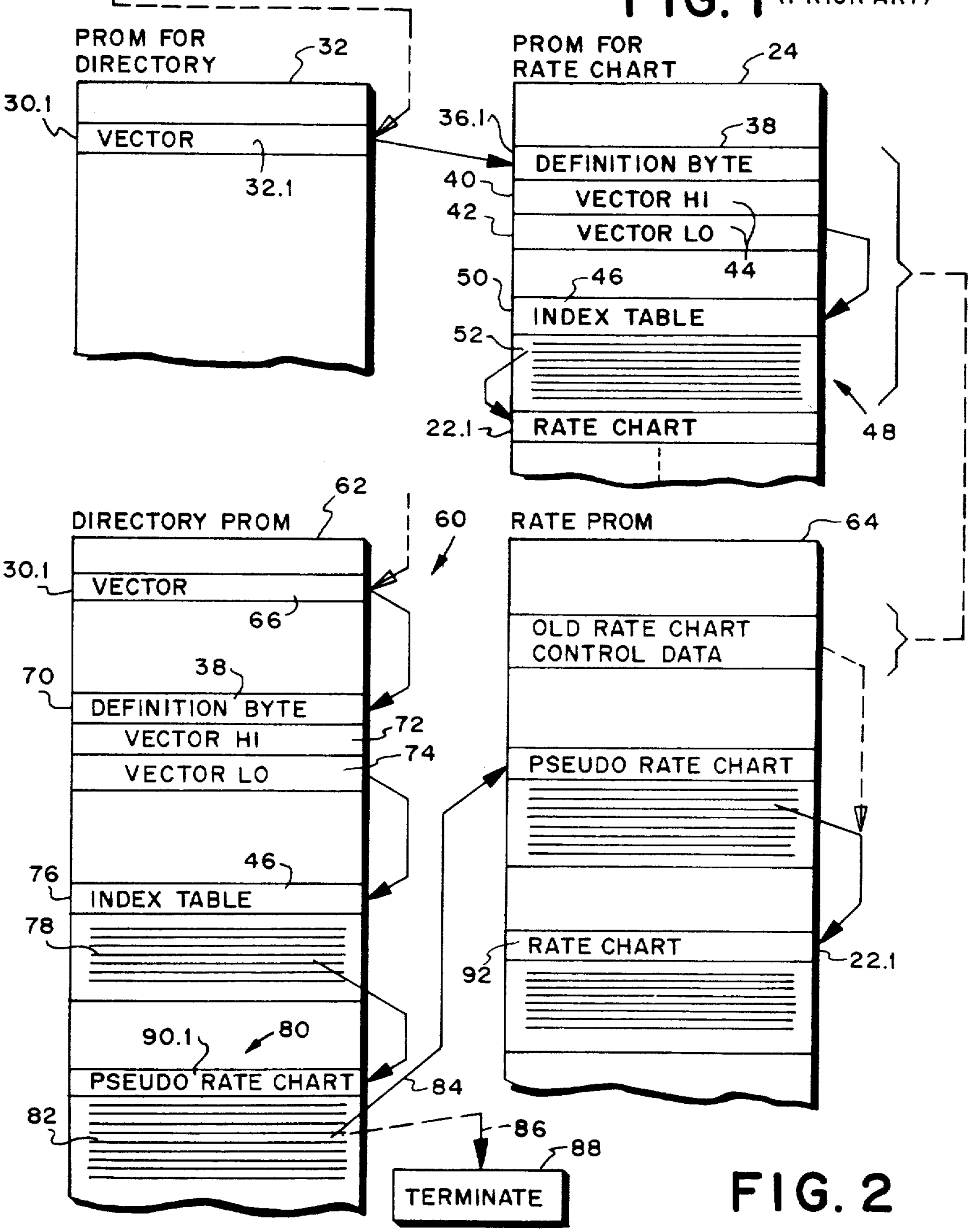
FIG. 2 is a schematic representation of one form of a data memory segment in accordance with the invention for use in a postage value computing system.

FIG. 2 illustrates one elegant technique 60 whereby rate charts 22 can be "individualized" or "unbundled" while control over their use in the user systems and their compatibility with existing systems is preserved. This technique 60 employs particular memory devices 62, 64 or PROMs used in the system 20 and which devices are respectively compatible with replaceable directory memory 32 or PROM and replaceable rate memory 24. (The terms data memory and PROM being used herein as fully equivalent.)

The memory devices 62, 64 store data accessed by the program used in system 20 as described in the aforementioned Dlugos et al patent. This program, as shown and described with reference to FIG. 18 of this patent, uses a directory memory containing vectors of addresses to lead the program to pertinent rate charts 22. The directory is a distinct separately replaceable PROM.

The directory 62 is accessed by the program in response to the actuation of a key such as 26.1 in keyboard 28 of system 20 shown in FIG. 1. This key actuation causes the program, after analyzing the key code, to address, for example, a vector 66 at location 30.1. The address identified by vector 66 in directory 62, however, transfers the program to a definition byte 38 as described with reference to FIG. 1 but now placed at a location such as 70 in directory PROM 62. The definition byte 38, as described, is followed by vectors 72, 74, similar to vectors 40, 42 but transferring the program to index table 46. The index table 46, however, is also now located in directory memory 62 starting at location 76.

As the program proceeds, as previously described, to compare the codes inputted by the actuation of keyboard 28 with the codes of the index table 46, a match at location 78 causes a transfer to a sub-directory 80 where, at a location 82, either the rate chart directing vector 84 is stored or an access denial vector 86 which causes a termination or return of the program at 88. This prevents use of a potentially non-current rate memory. The termination at 88 may constitute a repeated display of a prompt to alert the operator or such other termination as may appear appropriate.

With the subdirectory 80, directory 62 enables the exclusion of certain postage values from computation since access to the appropriate rate charts can be blocked by access denial vector 84. As many sub-directories like 80 can be used as access to specific postage computations is to be controlled. The new directories 62 may thus be used as separate replaceable memory devices with prior systems 20 with only the contents of vector locations 30 changed to function in the manner as described with reference to FIG. 2.

The subdirectory 80 provides access to the rate charts 22 with pseudo rate charts 90 that appear to the program as ordinary rate charts, except that the pseudo rate charts are designed to immediately transfer program operation to the next rate chart. In the embodiment of FIG. 2 the next rate chart is another pseudo rate chart 90.2 at location 91 in rate memory 64.

The technique 60 employed with the pseudo rate charts 90 relies upon a program test made before a rate chart is entered. This test, as described with reference to FIG. 18 in the aforementioned Dlugos et al patent, checks whether the scale weight of the article to be mailed falls in the weight range of the rate class about to be used. If not, then the program automatically advances to the next rate chart. By setting the start and stop weight values equal to the same value, for example, zero pounds or ounces as the case may be, the program immediately exits the pseudo rate chart 90. The program then advances to the next rate chart whose location is obtained from a known memory location in the pseudo rate chart 64, as shown in FIG. 9 of the Dlugos et al patent.

The pseudo rate chart 90.2 in turn includes the appropriate address for the next rate chart, which in the example of FIG. 2 is location 92 of rate chart 22.1.

The rate memory device 64 containing the rate charts 22 can be updated and replaced at the frequency required for the user. For example, if the user is limited in his access to rate chart 22.1, then only when this chart needs updating is a replacement PROM sent to the user. Note also that the user of an existing system 20 may continue to employ the directory 32 of FIG. 1 with rate memory 64 while using old rate chart control data such as the appropriate definition byte 38, vector 44 and index table 46 at locations and in such manner as described with reference to FIG. 1.

The individualized selection of desired rate charts thus become unique for the particular user. Since many combinations of selected rate charts are possible, the number of different directory memories 62 can become also very large. However, by limiting the unbundling of rates to control techniques in the directory memories 62, the rate memories can advantageously remain the same for all users.

Figure 3:
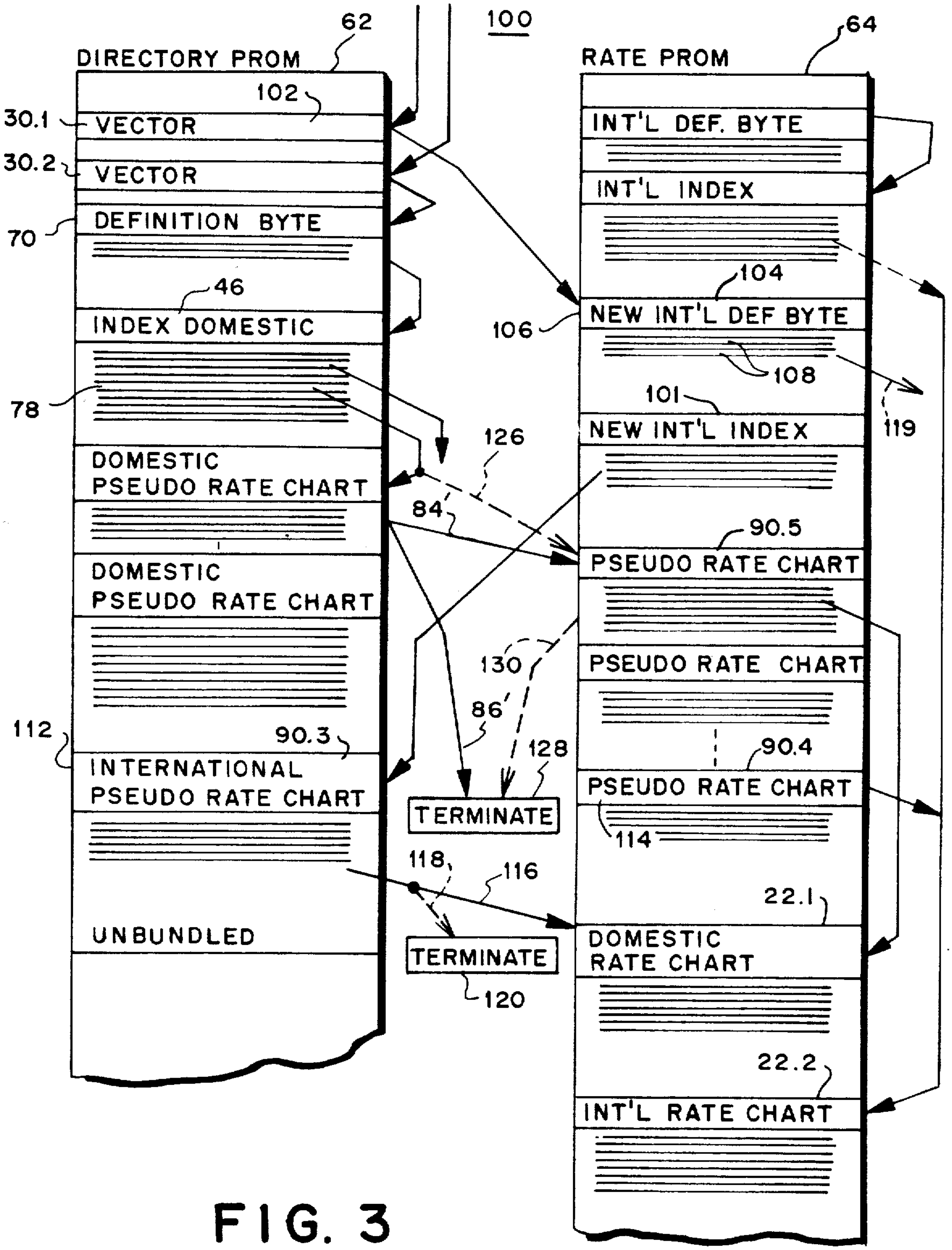
FIG. 3 is a schematic representation of another form of a data memory segment in accordance with the invention for use in a postage value computing system.

With the addition of pseudo rate charts 90 in directory PROM 62 and the inclusion of other data such as the definition bytes 38 and index tables such as 46, the storage capacity of the directory memory tends to become very large. This is expensive to the user and can become particularly burdensome in the unbundling of international rate charts. FIG. 3, therefore, illustrates a technique 100 for unbundling of international rate charts using pseudo rate charts only if and to the extent such unbundling is desired.

The latter desired unbundling can be achieved by making changes to the data memories 62, 64, without alteration of program steps. Since a user may select a domestic rate computation service and one or several international rate computation services, the embodiment in FIG. 3 enables proper unbundling of the domestic and international codes without imposing large capacity requirements on the directory memory 62.

In the embodiment of FIG. 3 an international index 101 is shown placed in the rate memory 64 when the directory memory 62 is deemed of insufficient capacity to store such index. Hence, when an international rate chart,; such as 22.2, is to be used, the actuation of the appropriate key 26.10 in the keyboard 28 (see FIG. 1) causes, for example, transfer to a vector 102 at location 30.2 in directory PROM 62. The latter vector transfers the program to definition byte 104 in location 106 of rate memory 64. The code vector 108 associated with that byte 104 transfers the program to index 101 where the address of the code entered by the operator is compared with those in the index 101. If a match is found, the program is directed to the proper international rate chart 22.2 via a first pseudo rate chart 90.3 at location 112 in directory memory 62 and pseudo rate chart 90.4 at location 114 in rate memory 64. Access is granted by providing a transfer vector 116 and denied with a vector 118 transferring the program to a termination at 120.

In the event the international rate charts are all made available to the user, the control obtained with pseudo rate charts 90.3 and 90.4 can be bypassed and the program directly transferred from index 101 to the appropriate international rate chart as suggested by the dashed line vector 119.

When additional international rate charts are to be unbundled, additional pseudo rate charts 90 are provided in directory PROM 62 and rate memory 64 to either grant or deny access to a selected international rate chart.

One variation of technique 100 enables a direct transfer from an index, such as 46 in the directory memory 62 to a pseudo rate chart 90.5 in rate memory 64. Such direct path is suggested by the dotted vector line 126. The pseudo rate chart 90.5 then either enables access to the domestic rate chart 22.1 or denies it with a program termination at 128 as suggested by dotted vector line 130.

Having thus described several embodiment for unbundling postage computational services for individual users, the advantages of the invention can be appreciated. Users may select those postage computation services they need, minimizing their rate memory replacements. Variations of the described embodiments may be made without departing from the scope of the invention.

What is claimed is:

1. An apparatus for limiting the computation of postage values to preselected mailing services with a system having a program controlled processor and replaceable memories in which data is stored in separate memory devices that include a rate chart memory containing rate chart data applicable to postage values and a directory memory containing vectors to direct a program to desired postage rate charts in response to keyboard actuations comprising:

replaceable rate chart memory means for use in said systems and containing postage rate charts; and replaceable directory memory means for use in said system and including pseudo rate chart means to store data effective to selectively direct the program to the postage rate charts and vector means for storing data effective to direct the program via the pseudo rate chart means to either the postage rate charts or a program termination.

2. The apparatus as claimed in claim 1 wherein said replaceable rate memory means includes pseudo rate chart means responsive to said pseudo rate chart means in said replaceable directory memory means to direct said program to the rate chart in the rate chart memory means.

3. The apparatus as claimed in claim 1 wherein said replaceable directory memory means further includes:

pseudo rate chart means for storing data effective to direct the program to either pseudo rate chart means in the rate memory means or to a program termination;

index means for storing codes and address locations of pseudo rate chart means to direct the program to the pseudo rate chart means in the directory memory means when a keyboard code entry matches a stored code in the index means; and wherein said vector means stores data effective to cause, in response to the actuation of the keyboard, a transfer of the program to said index means.

4. The apparatus as claimed in claim 3 wherein said replaceable rate memory means includes international rate charts and international rate chart index means for storing data representative of codes identifying international rate charts and the address location of associated pseudo rate chart means;

said latter pseudo rate chart means being located in said replaceable directory memory means and storing data effective to direct the program either to the international rate charts or a program termination.

5. A method of individualizing the computation of postage values to preselected mailing services with a system having a keyboard for operator controlled entries, a program controlled processor and replaceable memories in which data is stored in separate memory devices that include a rate chart memory containing rate chart data applicable to postage values and a directory memory containing vectors to direct the program to desired rate charts, wherein said rate charts include chart range data to identify the range of the rate chart and wherein the program includes a preliminary comparison test to examine from said chart range data whether postage for an article to be mailed can be obtained from the rate chart, comprising the steps of:

directing said program in response to the actuation of a keyboard entry from a vector located in the directory memory to a pseudo rate chart located in the directory memory; and selectively and effectively directing said program from said pseudo rate chart to either a rate chart to which access is requested by said keyboard entry or to a termination of the program.

6. The method for individualizing the computation of postage values as claimed in claim 5 wherein said selectively and effectively directing step includes the step of setting the range data for the pseudo rate charts at values selected to cause a failure of the comparison test.

7. The method for individualizing the computation of postage values as claimed in claim 5 or 6 wherein said selectively and effectively directing step includes the step of directing the program, in case access to a rate chart is granted, to said rate chart via pseudo rate chart located in rate chart memory.

8. The method for individualizing the computation of postage values as claimed in claim 5 wherein said directing step is preceeded by the steps of:

directing the program to an index of rate charts stored in the rate memory;

comparing a keyboard entered code with codes in the index in the rate memory; and directing the program to said pseudo rate chart in the directory memory when the comparison of the codes indicates a match.

9. The method for individualizing the computation of postage values as claimed in claim 5 wherein said directing step is preceeded by the steps of:

directing the program to an index of rate charts stored in the directory memory;

comparing a keyboard entered code with codes in the index in the rate; and directing the program to said pseudo rate chart in the directory memory when the comparison of the codes indicates a match.

* * * * *